United States Patent [19]
Pham

[11] Patent Number: 6,124,992
[45] Date of Patent: Sep. 26, 2000

[54] SYSTEM AND METHOD FOR RECONSTRUCTING A SIGNAL WAVE IN A PARTIAL RESPONSE READ CHANNEL

[75] Inventor: Bac V. Pham, San Jose, Calif.

[73] Assignee: Seagate Technology LLC, Scotts Valley, Calif.

[21] Appl. No.: 08/385,253

[22] Filed: Feb. 8, 1995

[51] Int. Cl.[7] ...................................................... G11B 5/09
[52] U.S. Cl. ................................................................. 360/46
[58] Field of Search .................................. 360/46, 51, 65, 360/53; 369/47, 48, 53; 375/286, 290, 340, 341, 349, 345

[56] References Cited

U.S. PATENT DOCUMENTS

| | | | |
|---|---|---|---|
| 5,121,262 | 6/1992 | Squires et al. | 360/46 |
| 5,311,376 | 5/1994 | Joan et al. | 360/51 |
| 5,341,249 | 8/1994 | Abbott et al. | 360/46 |
| 5,355,261 | 10/1994 | Taratorin | 360/53 |
| 5,383,064 | 1/1995 | Harman | 360/45 |

FOREIGN PATENT DOCUMENTS

| | | |
|---|---|---|
| 0 087 908 | 7/1993 | United Kingdom . |
| 0 581 717 A2 | 2/1994 | United Kingdom . |

OTHER PUBLICATIONS

"Implementation of PRML in a Rigid Disk Drive", by J.D. Coker, R.L. Galbraith, G.J. Kerwin, J.W. Rae, P.A. Ziperovich, *IEEE Transactions on Magnetic*, vol. 27, No. 6, Nov. 1991. pp. 4538–4543.

*Primary Examiner*—Paul Loomis
*Assistant Examiner*—Regina Y. Neal
*Attorney, Agent, or Firm*—Westman, Champlin & Kelly, P.A.

[57] ABSTRACT

A read channel is described for use in a storage device including a storage medium for storing data, an interactive element for reading information from and writing information on the storage medium and a processor for performing control functions in the storage device. The read channel comprises a set of electronic components for receiving and processing information read by the interactive element from the storage medium. Each component of the set of electronic components includes an output and is coupled in a predetermined arrangement to other components of the set of electronic components. A data capture circuit includes an input circuit and an output circuit with the input circuit being coupled to the output of each component of the set of electronic components, and the output circuit being coupled to the input circuit to capture a signal from a preselected one of the outputs coupled to the input circuit. The output circuit is adoptable to transfer the acquired signal to the processor.

32 Claims, 6 Drawing Sheets

SYSTEM AND METHOD FOR RECONSTRUCTING A SIGNAL WAVE IN A PARTIAL RESPONSE READ CHANNEL

FIELD OF THE INVENTION

The present invention is directed to disk drives. More particularly, the present invention provides an efficient and reliable system and method for selectively sampling a known signal waveform as it is processed by a data read channel such as a partial response, maximum likelihood read channel, and utilizing the sampled waveform to reconstruct signals representative of circuit transfer functions of the read channel.

BACKGROUND OF THE INVENTION

Disk drives are commonly used in workstations, personal computers, laptops and other computer systems to store large amounts of data that are readily available to a user. In general, a disk drive comprises a magnetic disk that is rotated by a spindle motor. The surface of the disk is divided into a series of data tracks that extend circumferentially around the disk. Each data track can store data in the form of magnetic transitions on the disk surface.

A head includes an interactive element, such as a magnetic transducer, that is used to sense the magnetic transitions to read data, or to conduct an electric current that causes a magnetic transition on the disk surface, to write data. The magnetic transducer includes a read/write gap that positions the active elements of the transducer at a position suitable for interaction with the magnetic transitions on the surface of the disk, as the disk rotates.

It is expected that users of disk drives will place ever greater demands on disk drive manufacturers with regard to the amount of data that can be stored in and rapidly retrieved from disk drive products. Modern software programs include graphics and other data structures that dramatically increase the amount of data that need to be stored. In addition, the rapid growth in the use of servers on computer networks requires large storage capabilities to accommodate the data needs of a large numbers of users on the network who utilize the servers.

Accordingly, recent disk drive research and development efforts have focused on the need to continually improve, among other things, the magnetic media used in the disks so as to substantially increase the storage capacity of each new disk drive design to levels sufficient to accommodate the ever greater demands for storage capacity placed on disk drive products by users. Moreover, the trend in recent years has been to design and build disk drive products that are lightweight and compact in size, and that operate at high rotational velocities of the disks to increase data read and write rates.

A consequence of the increasing capacity of disk drive products having compact designs is that the data density on the surface of the disks and the rotational speeds of the disks are approaching levels that are too high relative to the capability of conventional magnetic transducers to rapidly and accurately sense closely spaced, fast moving magnetic transitions in a data read operation. Moreover, conventional electronic circuits typically used to receive and process electrical signals representative of the transitions sensed by the magnetic transducers are also unable to operate at data read rates commensurate with the high data densities and rotational speeds of modern disk drive designs.

One proposal to meet the data retrieval requirements of modern disk drive designs is to utilize a magnetoresistive transducer (MR transducer) coupled to an electronic read channel that implements signal processing techniques such as partial response, maximum likelihood detection (PRML read channel). These components provide significantly improved performance capabilities and are able to process signals representative of data at rates suitable for operation with modern high capacity, high performance disk drives.

In an MR transducer, a magnetoresistive element is used to sense the magnetic transitions representing data. The magnetoresistive element comprises a material that exhibits a change in electrical resistance as a function of a change in magnetic flux of a magnetic field applied to the element. In a disk drive environment, the MR element is positioned within the transducer gap, above a disk surface. In this position, the electrical resistance of the element changes in time as magnetic transitions recorded on the disk pass beneath the gap, due to rotation of the disk. The changes in the resistance of the MR element caused by magnetic transitions on a disk occur far more quickly than the response of conventional transducers to magnetic transitions. Thus, an MR transducer is able to sense magnetic transitions at higher rotational speeds and data densities.

The MR transducer is coupled to an electronic circuit, e.g. a pre-amplifier, that operates to detect the resistance changes of the MR element, and generate electrical signals that vary in time as a function of the resistance changes. The pre-amplifier output, therefore, comprises an electrical signal that corresponds to the data recorded as magnetic transitions on the disk surface. The output of the pre-amplifier is coupled to a read channel that thereafter processes the pre-amplifier output signal according to PRML techniques to interpret the data represented by the output signal. PRML techniques can operate with more efficient data recording codes, and are able to process signals at more rapid rates than conventional peak detectors now widely used in disk drives to detect data from signals received from a transducer.

In any signal processing electronic circuit, such as a PRML read channel, the electrical signal output by the circuit varies as a function of the electrical signal input to the circuit. For example, in a simple amplifier, the signal output by the amplifier should have the same wave shape and frequency as the signal input to the amplifier, but with a higher amplitude. In other words, the amplifier amplifies the magnitude of the input signal.

The change between the input and output signals is referred to as the transfer function of the circuit. In the case of an ideal, simple amplifier, the transfer function can be expressed as output=k*(input), where k is a coefficient representing the magnitude of amplification. If the amplifier amplifies an input signal by a factor of 10, then k, in that instance, equals 10, and a one volt input signal will result in a 10 volt output signal.

Actual electronic circuits do not, however, operate in the ideal fashion that they were designed. An amplifier will introduce some "noise" into the output signal such that the output does not necessarily have the exact same wave shape and/or frequency phase as the input signal. Generally, "noise" is any unwanted electrical changes introduced into a circuit's output that may result form, e.g., certain operating characteristics inherent in the circuit design, the operating environment of the circuit, and so on.

Electronic circuits that implement or support PRML signal processing techniques are complex and include various operating parameters that affect circuit output, and thus the accuracy of data interpretation. For example, a PRML channel can include a finite impulse response filter (FIR filter) for filtering and conditioning raw signals received from an MR transducer. The FIR filter acts to shape signals received from the disk to be within desired channel response characteristics of the PRML channel for optimal performance. The FIR filter generates shaped samples from selected summations of raw samples of the signals derived from magnetic transitions on the disk. The raw samples are modified by coefficients prior to transmission to a summation node.

It is possible to test a PRML channel to determine the accuracy of data interpretation, and to vary the values of operating parameters of the component circuits comprising the channel, such as the coefficients of the FIR filter, to obtain optimized operation of the channel. In one approach, a test signal having a known pattern is written onto a disk of a PRML disk drive under test. The disk drive is then operated to use the MR transducer to read back the test signal.

The read back signal is input to the PRML channel of the drive under test. A high performance oscilloscope is coupled to the outputs of selected component circuits of the PRML channel, to receive and record the output signals. For example, the output of the FIR filter can be input to the oscilloscope. The recorded signals are then compared to the known pattern of the input test signal. By comparing the known pattern of the input signal to the various output signals received by the oscilloscope, the transfer functions of the component circuits of the PRML channel can be determined.

In the event that a determined transfer function(s) provides an output signal that does not comply with a proper or accurate interpretation of the input signal, the various parameters of the respective component circuit(s) of the PRML channel can be changed or modified in a manner to alter the respective transfer function(s). In the case of the FIR filter, the transfer function should reveal the proper shaping of the raw signals relative to the desired channel response characteristics of the PRML channel. After modification of the parameters, the drive can be tested again to once again determine the transfer function(s), and verify accurate performance by the channel. By changing and modifying parameters such as FIR coefficient values, optimized values can be found for reliable performance of the PRML channel of the disk drive under test.

As no two circuits are identical, the optimized values for parameters of component circuits of any one PRML channel will differ from the optimized values for another PRML channel. Accordingly, each disk drive should be tested during the manufacturing process to optimize the PRML channel for that drive. A problem with the above-described approach to optimizing a PRML channel is that the high performance oscilloscope required to perform testing of each drive is expensive. In a mass production disk drive assembly facility, many test oscilloscopes would be needed to test all drives in a manner that does not create a bottleneck in the assembly line. Moreover, a relatively skilled technician would be required to connect and operate each test oscilloscope.

SUMMARY OF THE INVENTION

The present invention provides a system and method to accurately and efficiently optimize operating parameters of complex circuits typically used in read channels such as PRML channels. According to the present invention, advantage is taken of electronic components ordinarily assembled into the disk drive product for normal drive operation, to perform testing and diagnosis of the PRML channel.

For example, a digital signal processor (DSP) is an electronic processor installed in modern disk drives to control various functions required during the normal operation of the drive. The DSP can be utilized after assembly into the drive to perform signal processing tasks designed to determine transfer functions of the component circuits of the PRML channel of the drive. Thus, expensive external components, such as the oscilloscope of the previously discussed proposal, are not required to optimize operating coefficients.

Pursuant to the present invention, a signal is generated by use of, e.g, a pseudo-random signal generation algorithm, for use as a test signal. The pattern of the signal generated at any one time will be known upon generation, and the disk drive is operated to write the known generated signal onto a disk of the drive. The pseudo-random signal is used as a proxy for data that would ordinarily be written as magnetic transitions on the disk. The disk drive is then operated to read back the written test signal, using the PRML channel to interpret the magnetic transitions representing the test signal. A data capture circuit is arranged in the PRML channel to selectively capture the output of any one of the components of the PRML channel during the read back, and to transfer the captured output to a processor available in the disk drive, such as, e.g., the DSP.

In an exemplary embodiment of the present invention, the data capture circuit comprises an n-to-1 multiplexer coupled to a sample and hold circuit. The n-to-1 multiplexer has each of n inputs coupled to an output of a respective one of the component circuits of the PRML channel of the disk drive. For example, the output of the FIR filter can be coupled to one of the inputs of the multiplexer. The output of the multiplexer is coupled to the input of the sample and hold circuit whose timing at any one time is controlled by a preselected clock appropriate for the component circuit selected at the time. According to well known multiplexer design, any one of the inputs of the multiplexer can be selected at any one time for transmission to the output of the multiplexer.

The multiplexer/sample and hold arrangement permits signal samples to be selected from the outputs of any number of the component circuits of the PRML channel during read back of the pseudo-random signal written onto the disk, at time intervals, in each case, corresponding to the clock controlling the selected component circuit, while accommodating the generally slower clock period of the DSP. To that end, the output of the sample and hold circuit is coupled to an input port of the DSP on board the disk drive, and samples held by the sample and hold circuit are clocked into the DSP at the clock rate of the DSP. In this manner, samples can be received from any particular component circuit of the PRML channel for which optimization is desired, at one clock period, appropriate for the particular component circuit, and transmitted to the DSP at the DSP clock cycle, such that the DSP is usable to receive PRML signal samples during read back of the pseudo-random signal written onto the disk.

The DSP stores the samples, as well as the pseudo-random signal written onto the disk, in a memory also available in the disk drive for use during the normal operation of the drive. The stored signals are then available to the DSP for processing. Accordingly, the DSP can be programmed to use the stored samples received from the sample and hold circuit to reconstruct the signals represented by the outputs of the various component circuits and to perform comparison operations between the reconstructed signals and the pseudorandom signal written onto the disk, to determine the transfer functions of component circuits of the PRML channel. The DSP can thereafter perform operations to optimize parameters of the component circuits of the PRML channel as a function of the reconstructed signals.

Thus, the present invention streamlines the optimization process by using memory and processing circuits already in the disk drive, to perform optimization operations for a PRML channel based upon actual reconstructions of the outputs of the components of the PRML channel. The multiplexer enables the output of any one of the component circuits of the PRML channel of interest in the optimization process, to be coupled to the DSP of the disk drive via the sample and hold circuit. Samples from the output are then readily stored by the DSP in a memory space already available in the disk drive for future use by the DSP. DSP's ordinarily assembled into disk drive products comprise sophisticated electronic processors whose resources have not, prior to the present invention, been utilized to perform optimization of PRML channels for high performance disk drive operation.

DETAILED DESCRIPTION

Figure 1:
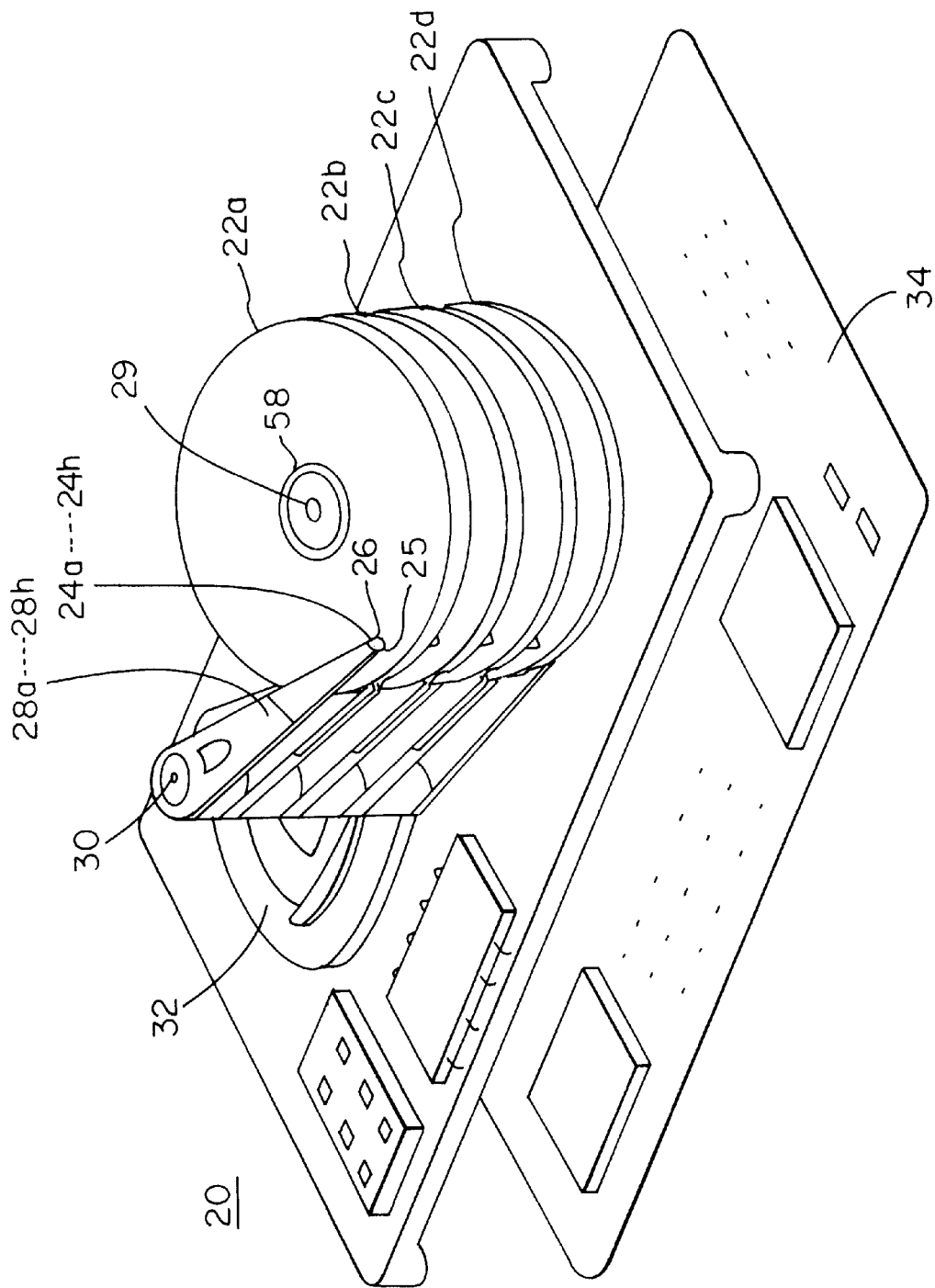
FIG. 1 is perspective view of an exemplary disk drive.

Referring now to the drawings, and initially to FIG. 1, there is illustrated an example of a disk drive designated generally by the reference numeral 20. The disk drive 20 includes a plurality of storage disks 22a–d and a plurality of read/write heads 24a–h. Each of the storage disks 22a–d is provided with a plurality of data tracks to store user data. As illustrated in FIG. 1, one head is provided for each surface of each of the disks 22a–d such that data can be read from or written to the data tracks of all of the storage disks. It should be understood that the disk drive 20 is merely representative of a disk drive system utilizing the present invention and that the present invention can be implemented in a disk drive system including more or less storage disks.

The storage disks 22a–d are mounted for rotation by a spindle motor arrangement 29, as is known in the art. Moreover, the read/write heads 24a–h are supported by respective actuator arms 28a–h for controlled positioning over preselected radii of the storage disks 22a–d to enable the reading and writing of data from and to the data tracks. To that end, the actuator arms 28a–h are rotatably mounted on a pin 30 by a voice coil motor 32 operable to controllably rotate the actuator arms 28a–h radially across the disk surfaces.

Each of the read/write heads is mounted to a respective actuator arm 28a–h by a flexure element (not shown) and comprises a magnetic transducer structure 25 mounted to a slider 26 having an air bearing surface (not shown), all in a known manner. For high performance operation, the magnetic transducer structure 25 can comprise a pair of transducers, including a magnetoresistive element (MR element) as a read transducer and an inductance coil as a write transducer. As typically utilized in disk drive systems, the sliders 26 cause the magnetic transducer structures 25 of the read/write heads 24a–h to "fly" above the surfaces of the respective storage disks 22a–d for noncontact operation of the disk drive system, as discussed above. When not in use, the voice coil motor 32 rotates the actuator arms 28a–h during a contact stop operation, to position the read/write heads 24a–h over a respective landing zone 58 or 60, where the read/write heads 24a–h come to rest on the storage disk surfaces. As should be understood, each of the read/write heads 24a–h is at rest on a respective landing zone 58 or 60 at the commencement of a contact start operation.

A printed circuit board (PCB) 34 is provided to mount control electronics for controlled operation of the spindle motor 29 and the voice coil motor 32. The PCB 34 also includes read/write channel circuitry coupled to the read/write heads 24a–h, to control the transfer of data to and from the data tracks of the storage disks 22a–d. The manner for coupling the PCB 34 to the various components of the disk drive is well known in the art.

Figure 2:
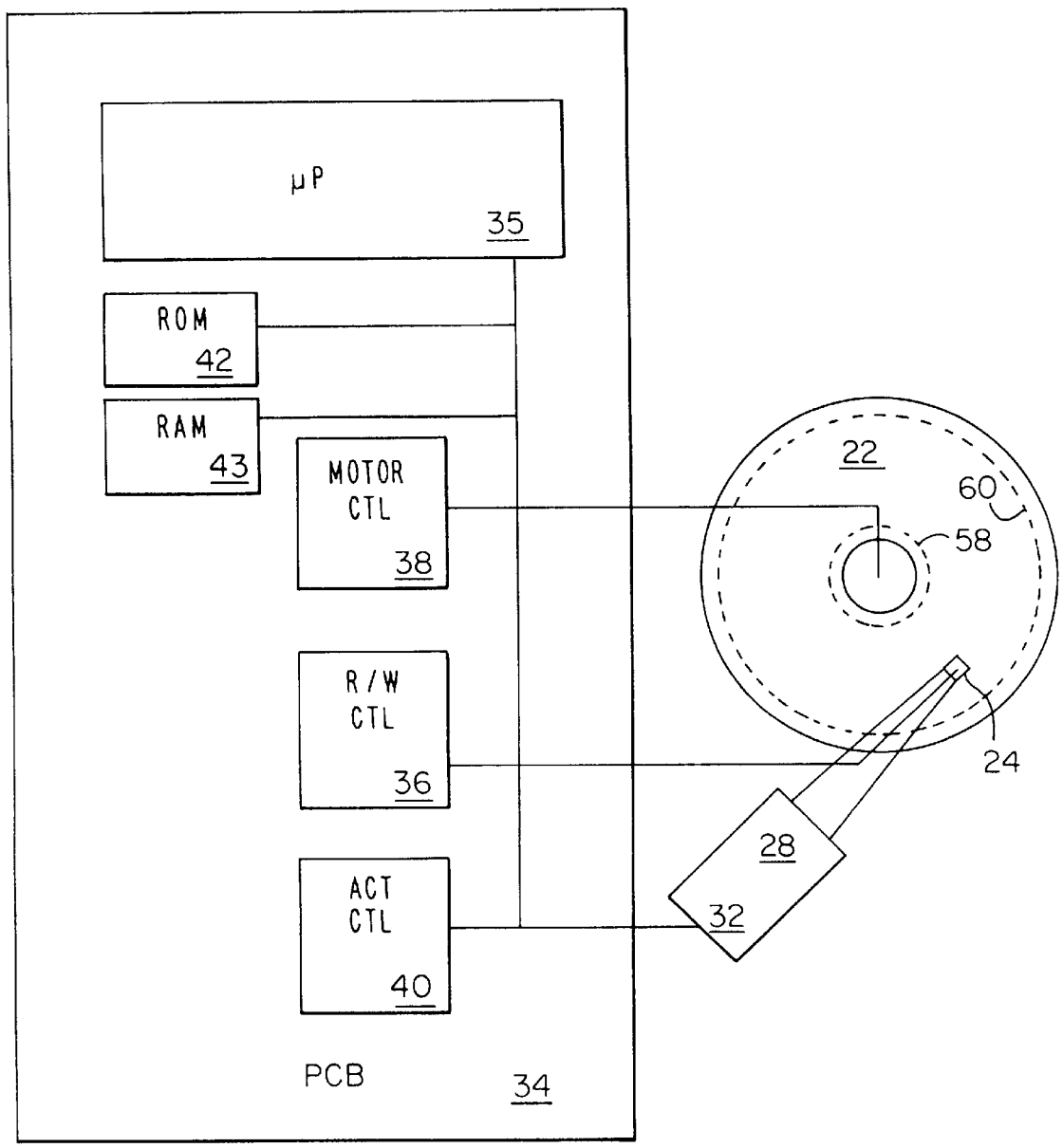
FIG. 2 is a top plan view of the printed circuit board of the disk drive of FIG. 1.

Referring now to FIG. 2, there is illustrated in schematic form the PCB 34 and the electrical couplings between the control electronics on the PCB 34 and the components of the disk drive system described above. A microprocessor 35 is coupled to each of a read/write control 36, spindle motor control 38, actuator control 40, ROM 42 and RAM 43. In modern disk drive designs, the microprocessor can comprise a digital signal processor (DSP). The microprocessor 35 sends data to and receives data from the storage disks 22a–d via the read/write control 36 and the read/write heads 24a–h.

The microprocessor 35 also operates according to instructions stored in the ROM 42 to generate and transmit control signals to each of the spindle motor control 38 and the actuator control 40.

The spindle motor control 38 is responsive to the control signals received from the microprocessor 35 to generate and transmit a drive voltage to the spindle motor 29 to cause the storage disks 22a–d to rotate at an appropriate rotational velocity.

Similarly, the actuator control 40 is responsive to the control signals received from the microprocessor 35 to generate and transmit a voltage to the voice coil motor 32 to controllably rotate the read/write heads 24a–h, via the actuator arms 28a–h, to preselected radial positions over the storage disks 22a–d. The magnitude and polarity of the voltage generated by the actuator control 40, as a function of the microprocessor control signals, determines the radial direction and speed of the read/write heads 24a–h.

When data to be written or read from one of the storage disks 22a–d are stored on a data track different from the current radial position of the read/write heads 24a–h, the microprocessor 35 determines the current radial position of the read/write heads 24a–h and the radial position of the data track where the read/write heads 24a–h are to be relocated. The microprocessor 35 then implements a seek operation wherein the control signals generated by the microprocessor 35 for the actuator control 40 cause the voice coil motor 32 to move the read/write heads 24a–h from the current data track to a destination data track at the desired radial position.

Figure 3:
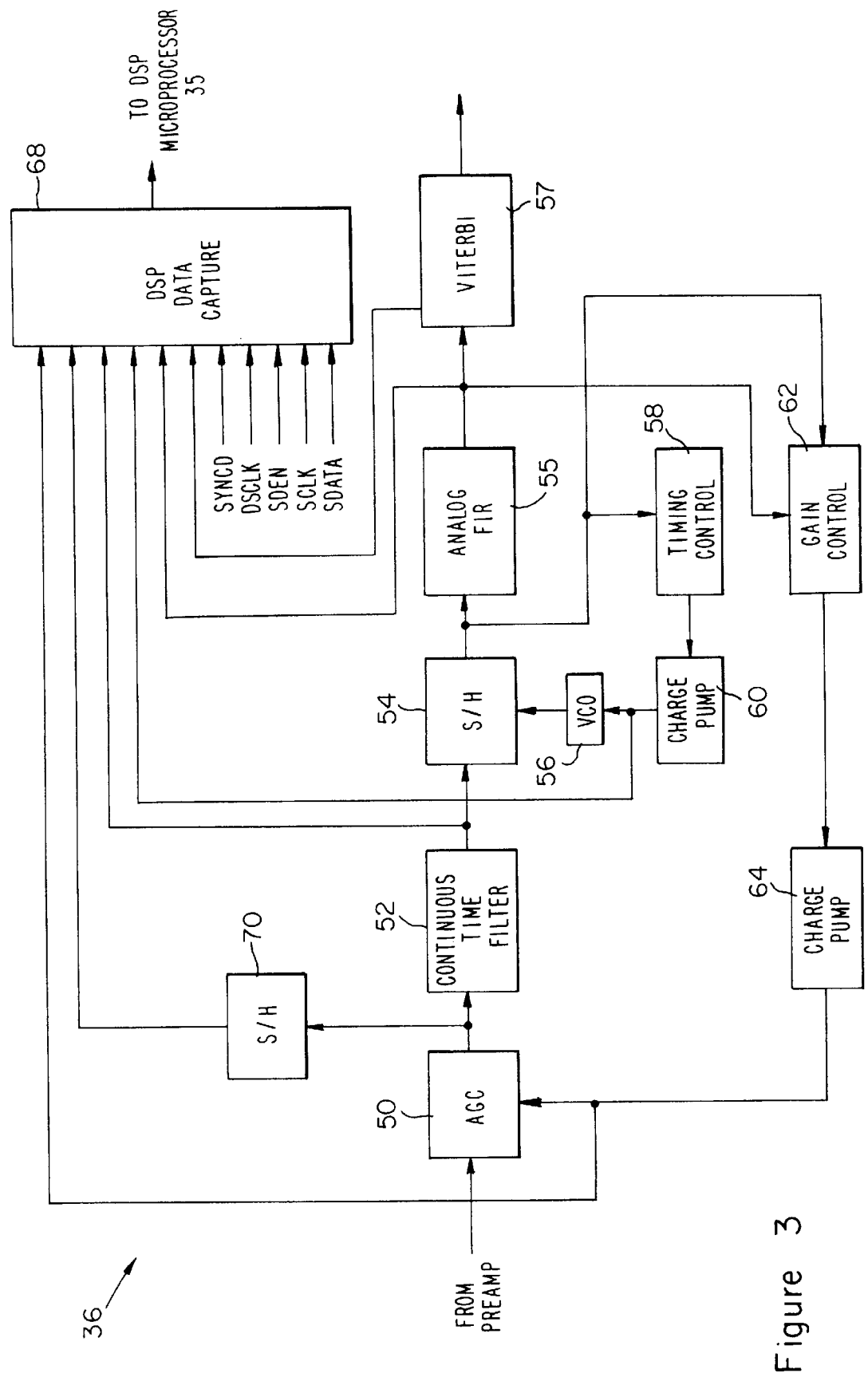
FIG. 3 is a block diagram of a representative PRML channel used in the disk drive of FIGS. 1 and 2, and including the coupling to the DSP of the disk drive, according to an exemplary embodiment of the present invention.

When the actuator has moved the read/write heads 24a–h to the destination data track, a multiplexer (not shown) is used to couple the head 24a–h over the specific data track to be written or read, to the read/write control 36, as is generally known in the art. The read/write control 36 includes a read channel that, in accordance with modern disk drive design, comprises a partial response, maximum likelihood read channel, for high performance processing of electrical signals transduced by the MR element during a read operation. The RAM 43 can be used to buffer data read from or to be written to the storage disks 22a–d FIG. 3 illustrates, in block diagram form, a representative PRML channel included in the read/write control 36. In accordance with known disk drive design, the electrical signals transduced by the MR element from the magnetic transitions on the disk surface, are processed by a preamplifier (not shown) whose output is coupled to an input of an automatic gain control amplifier (AGC) 50. The AGC 50 is used to maintain a constant signal amplitude for the signals transmitted into the PRML read channel, while the input to the AGC varies in amplitude.

An output of the AGC 50 is coupled to a continuous time filter 52. The continuous time filter 52 provides filtering and partial amplitude and phase equalization for the signals transmitted in the PRML read channel. An output of the continuous time filter 52 is coupled to a sample and hold circuit 54 that periodically samples the output of the continuous time filter 52. The sample and hold circuit 54 holds each sample and controllably transfers each sample to an input of a finite impulse response filter (FIR filter) 55 for filtering and conditioning samples of raw signals received from the MR transducer, as will be described in more detail below. The frequency of operation of the sample and hold circuit 54 is controlled by a voltage controlled oscillator (VCO) 56.

A timing control device 58 receives an output signal from the sample and hold circuit 54, and charges a charge pump 60 to maintain a preselected control voltage value for input to the VCO 56, as is known. The output of the sample and hold circuit 54 is also input to a gain control 62. The gain control 62 charges a charge pump 64, to provide a gain level control to the AGC 50.

An output of the FIR filter 55 is coupled to an input of a Viterbi decoder 57. The Viterbi decoder 57 electronically implements known Viterbi algorithms to decode the samples of electric signals derived from the transduction of magnetic transitions by the MR element, according to partial response, maximum likelihood (PRML) techniques. PRML techniques are known to enable high performance decoding of samples of electric signals to derive digital information encoded in the signals. The digital information represents the data stored on the disk surfaces, and the output of the Viterbi decoder 57 provides digital signals that, after further processing, can be output by the disk drive as data for use by a computer.

Figure 8:
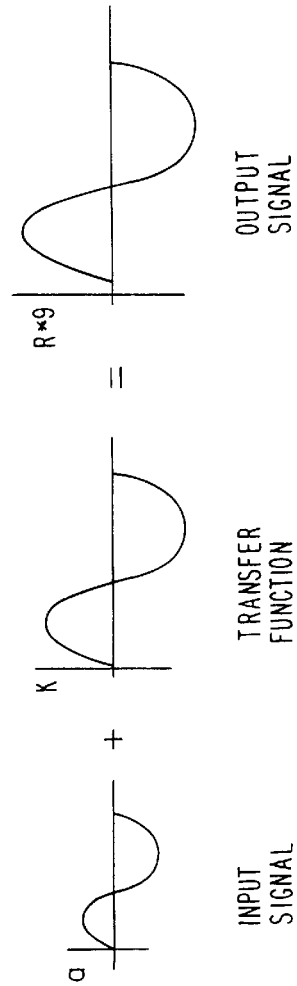
FIG. 8 is a illustration of a circuit transfer function.

Each of the components of the PRML channel illustrated in FIG. 3 comprises complex and sophisticated electronic circuitry that affects input signals as a function of various operating parameters embodied in the component. As discussed above, the change between the input and output signals of each component is referred to as the transfer function of the circuit. FIG. 8 provides an illustration of a transfer function for a simple amplifier. The input to the amplifier is a sine wave of a first maximum amplitude a. The transfer function of the amplifier is a waveform of the same shape and frequency of the input signal, but with a multiplying effect k on the signal amplitude. The output signal, as a function of the effect of the transfer function on the input signal, is also a sine wave, but with a maximum amplitude equal to k*a. The precise transfer function of each component of the PRML channel is an important factor for high performance operation of the channel. Each transfer function can be modified to optimize the operation of the channel by adjusting values of operating parameters of the respective component.

Figure 6:
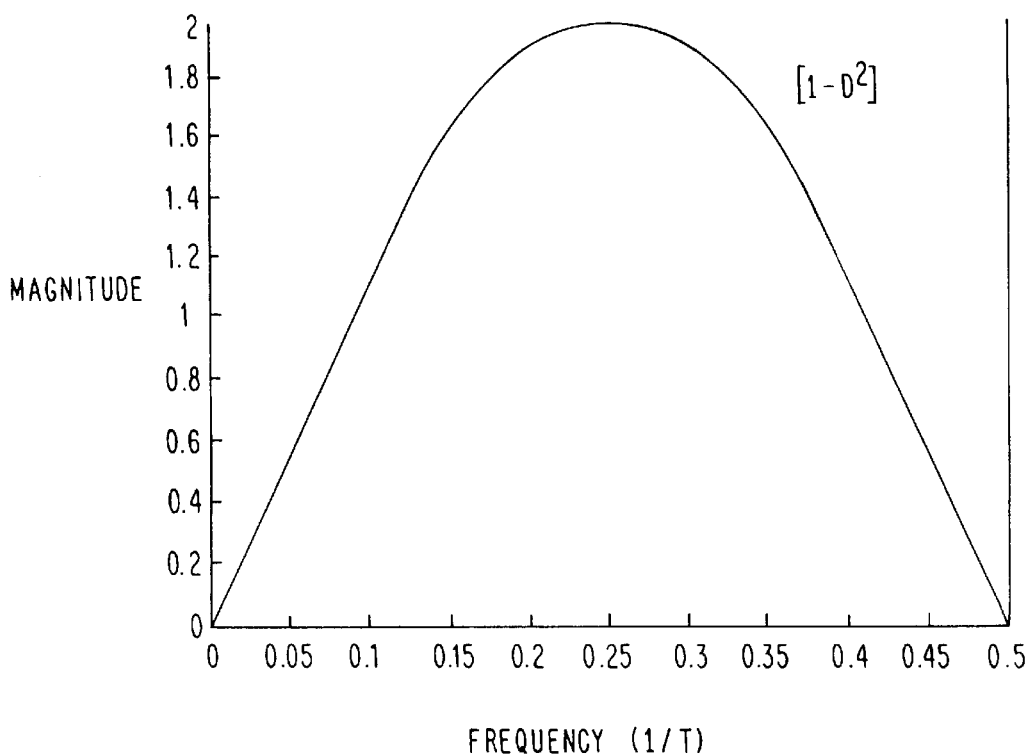
FIG. 6 is a graph illustrating channel response characteristics of the PRML channel of FIG. 3.
Figure 7:
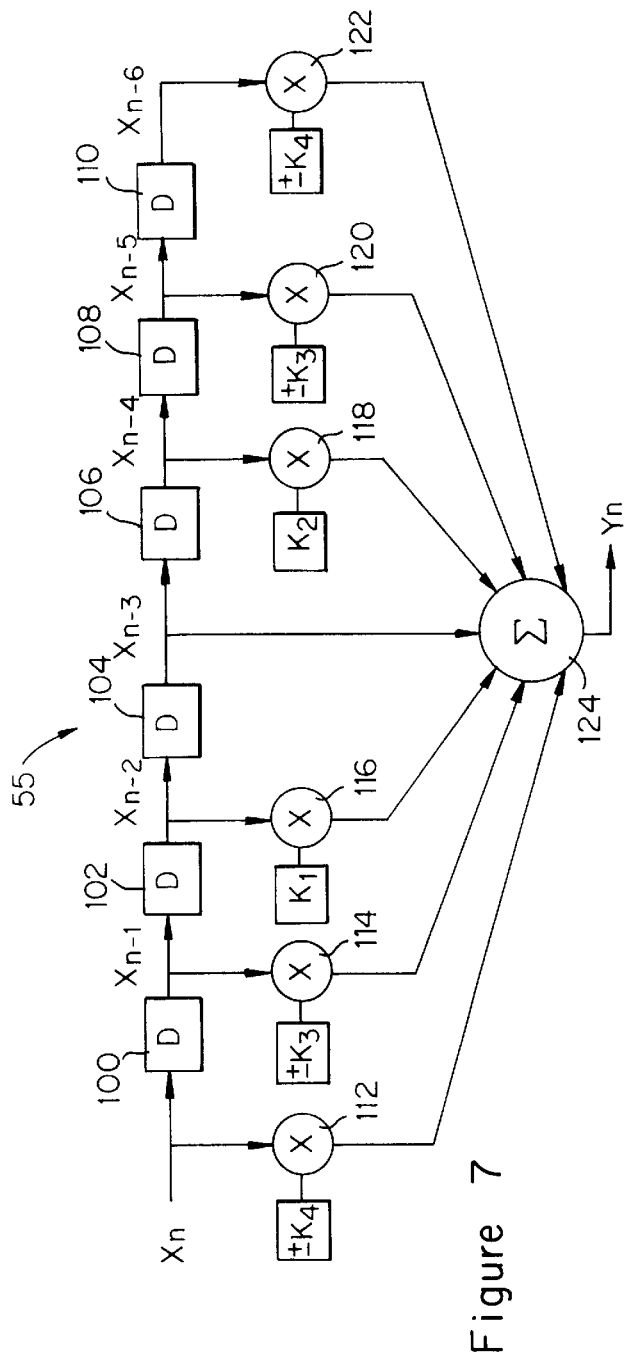
FIG. 7 is a block diagram of a representative FIR filter circuit.

By way of example, reference is now made to FIG. 7, where there is illustrated, in block diagram form, a representative circuit for the FIR filter 55 of the PRML channel. The FIR filter 55 is used to filter and condition raw samples of the transduced signals from the MR head, for optimized operation of the Viterbi decoder 57. The Viterbi decoder 57 exhibits optimized channel response characteristics when the magnitude response is within the frequency spectrum shown in FIG. 6. The FIR filter 55 conditions raw samples to provide samples that are within the frequency spectrum required for optimized Viterbi performance.

The FIR filter 55 comprises a seven tap, analog filter of a type used in PRML channels of modern disk drives. The sample and hold circuit 54 periodically outputs a raw signal sample X for input to the FIR filter 55. The FIR filter 55 comprises a series of six signal sample holding devices D, indicated by reference numerals 100, 102, 104, 106, 108 and 110, respectively. The sample $X_n$ of each period, output by the sample and hold circuit 54, is input to the first one of the devices D 100. The devices D are arranged in the series such that the output of each device, with the exception of the last-in-series device 110, is coupled to the input of the next device D in the series.

In this manner, the sample of each of seven consecutive sample periods can be held in a respective one of the series of devices, and tapped for multiplication and summation, as will appear. The operation of the FIR filter 55 is controlled to shift the contents of each device D to the next device in the series at each sample time. As illustrated in FIG. 7, the sample $X_n$ of a current period is input to the device 100 as the contents of the device 100 (the sample $X_{n-1}$ from the previous sample period) is available at the output of the device 100 for application to the input of the next-in-series device 102. This scheme is carried out throughout the series, such that samples from five additional previous sample periods, in sequence, $X_{n-2}$ $X_{n-3}$, $X_{n-4}$, $X_{n-5}$, and $X_{n-6}$, are available at the outputs of respective devices 102, 104, 106, 108 and 110, when the current sample $X_n$ is applied to the FIR filter 55 input by the sample and hold circuit 54, and the sample $X_{n-1}$ is available at the output of the device 100.

A series of sample multipliers 112, 114, 116, 118, 120 and 122, respectively, is arranged such that the sample of the current period $X_n$ is applied to the input of the multiplier 112, the sample $X_{n-1}$ at the output of the device 100 is applied to the input of the multiplier 114, the sample $X_{n-2}$ at the output of the device 102 is applied to the input of the multiplier 116, the sample $X_{n-4}$ at the output of the device 106 is applied to the input of the multiplier 118, the sample $X_{n-5}$ at the output of the device 108 is applied to the input of the multiplier 120 and the sample $X_{n-6}$ at the output of the last-in-series device 110 is applied to the input of the multiplier 122.

Each multiplier 112, 114, 116, 118, 120 and 122 multiples the input sample value by a coefficient $K_x$. The values for $K_x$ are stored in registers (shown schematically in FIG. 7 by a box drawn around each coefficient) available on the read/write control 36 in accordance with known integrated circuit design, and are applied from the respective registers to inputs of respective ones of the multipliers. As shown in FIG. 7, the multiplier 112 multiplies the sample $X_n$ by coefficient $+/-K_4$, the multiplier 114 multiplies the sample $X_{n-1}$ by coefficient $+/-K_3$, the multiplier 116 multiplies the sample $X_{n-2}$ by coefficient $K_1$ the multiplier 118 multiplies the sample $X_{n-4}$ by coefficient $K_2$, the multiplier 120 multiplies the sample $X_{n-5}$ by coefficient $+/-K_3$ and the multiplier 122 multiplies the sample $X_{n-6}$ by coefficient $+/-K_4$.

An output of each multiplier 112, 114, 116, 118, 120 and 122 is coupled to an input of a summation node 124. The sample $X_{n-3}$, output by device 104, is also coupled to an input of the summation node 124. The output of the summation node 124, $Y_n$, is a sum of all of the inputs to the node at one sample time, and represents a filtered and conditioned sample that is optimized in respect of the frequency spectrum for idealized channel response characteristics, shown in FIG. 6, for input to the Viterbi decoder 57. There is a conditioned sample $Y_n$ applied to the input of the Viterbi decoder 57 for each raw sample $X_n$ taken by the sample and hold circuit 54, and the Viterbi decoder 57 decodes the conditioned samples $Y_n$ to derive digital information, as discussed above.

The transfer function of the FIR filter 55 is affected by the values for the coefficients $K_x$, and the transfer function can be modified to achieve optimized operation for the Viterbi decoder 57, by changing the values of the coefficients $K_x$ stored in the registers. A determination of optimized values for the coefficients $K_x$ can be based upon knowledge of the actual signal waveform output by the FIR filter 55, particularly when the waveform of the input signal is known. Thus, an ability to capture and reconstruct the output signal of the FIR filter 55, or the output signal of any of the other complex electronic components of the PRML channel, facilitates analytical processing of read channel performance to fine tune operating parameters.

According to the present invention, a data capture circuit 68 is arranged in the read/write control 36 to selectively capture output signals of various components of the PRML channel. To that end, the data capture circuit 68 includes a series of inputs, each one coupled to the output of a respective one of the components of the PRML read channel. Thus, as shown in FIG. 3, the output of the FIR filter 55, in addition to being coupled to the Viterbi decoder 57 for normal signal processing in a read operation, is also coupled to an input of the data capture circuit 68.

Likewise, the outputs of the filter 52, charge pump 60, charge pump 64 and Viterbi decoder 57 are coupled to the data capture circuit 68. In addition, a sample and hold circuit 70 is arranged to sample the output of the AGC 50 for input of samples of the AGC 50 to an input of the data capture circuit 68. The data capture circuit 68 operates to select any one of the inputs at a time to capture the output signal of the selected component for sampling of the signal.

An output of the data capture circuit 68 is coupled to the microprocessor 35 installed in the disk drive, which in this exemplary embodiment of the present invention, comprises a digital signal processor (DSP). The output can comprise an analog to digital converter to convert each sample output by the data capture circuit 68 to a digital value for input to the DSP. In this manner, the data capture circuit 68 can transmit samples of the captured signal to the DSP. The DSP, in turn, can store the captured samples in the RAM 43 for subsequent use to reconstruct the captured output signal and process the reconstructed signal for determination of optimized parameters for the PRML read channel.

As illustrated in FIG. 3, a set of status, clock and data lines is coupled to the data capture circuit 68. The set of lines includes a SYNCD line, a DSCLK line, an SDEN line, an SCLK line and an SDATA line. Each of the status, clock and data lines is of the type of conventional clocking, control and data path lines as would ordinarily be provided in an integrated circuit implementing a PRML channel.

The SYNCD line, when set in a preselected state, indicates that signals in the PRML channel represent data. This line is used by the data capture circuit 68 to determine when to capture signals applied at a selected input.

The DSCLK line is the main clock in the PRML channel, and is used to clock data signals through the channel. The data capture circuit 68 uses the DSCLK to control the timing of the capture of a signal applied to a selected input.

The set of SDEN, SCLK and SDATA lines comprises a serial port circuit. As is well known, an integrated circuit such as would implement the read/write control 36, typically includes an addressable register set to store control and status information relevant to the operation of the circuit. A conventional serial port circuit would be included in the read/write control 36 to support communication via the coupling between the microprocessor 35 (DSP) and the read/write control 36 (see FIG. 2), such that the DSP can address and then read or write preselected registers within the read/write control 36 to control the transfer of data and information between theses components.

As will be described below, the data capture circuit 68 includes certain addressable registers that are written by the DSP to control the selection of input and signal sample timing by the data capture circuit. Signals applied to the lines of the serial port circuit are used in connection with the writing of the data capture circuit registers. To that end, the signal on the SDEN line is an enable signal that is set in a preselected state to indicate that the serial port circuit is available to transfer information to or from registers of the read/write control 36. The signal on the SCLK line is a clock signal for timing the transfer of information read from or written to the registers. The SDATA line carries register address information and data. Typically, data presented to the SDATA line is latched into or form an addressed register on each rising edge of the SCLK clock signal.

Figure 4:
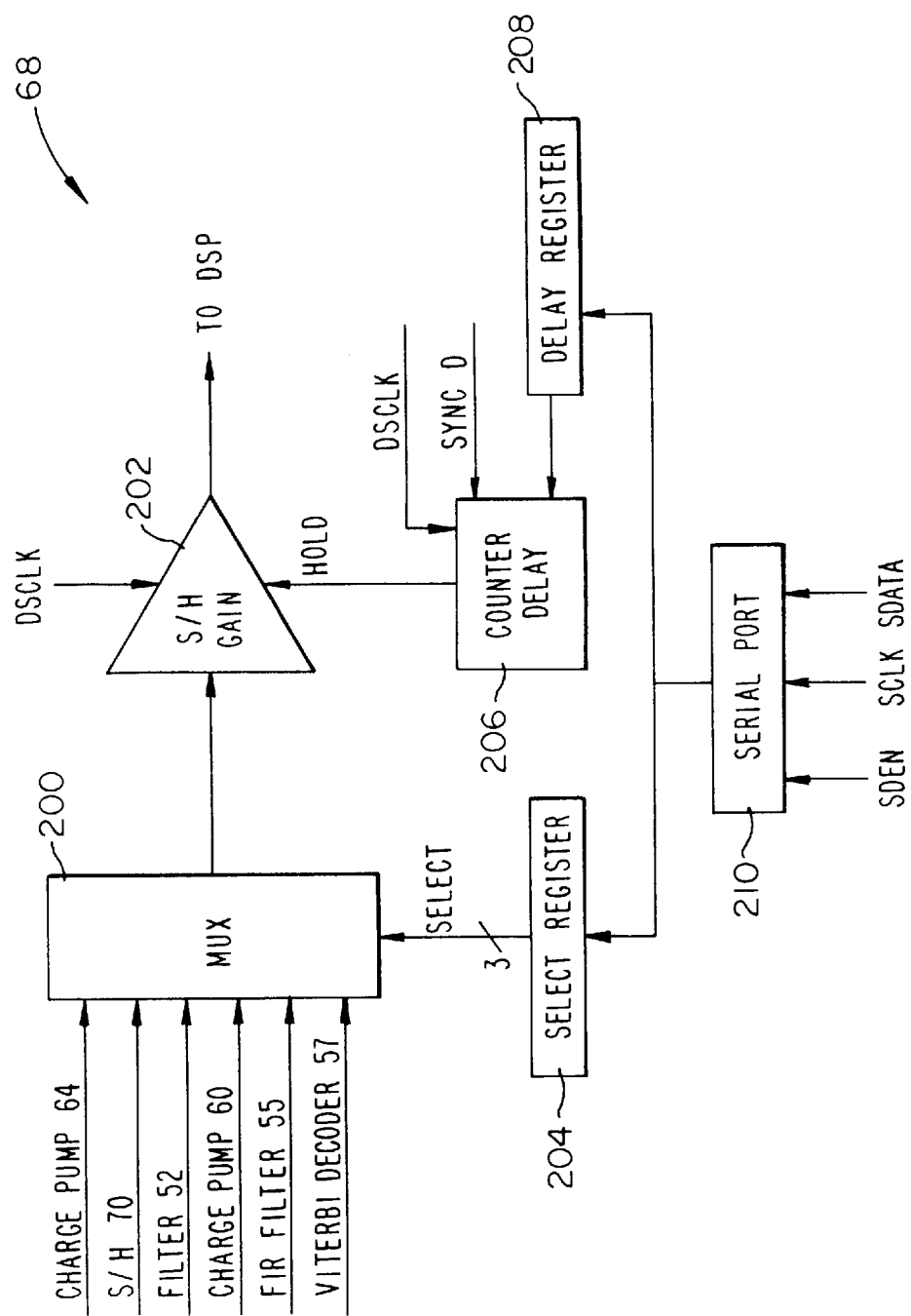
FIG. 4 is a block diagram of the DSP capture block of FIG. 3.

Referring now to FIG. 4, there is illustrated a block diagram of the DSP capture circuit 68. Each input to the data capture circuit 68 is applied to the input of a multiplexer 200. An output of the multiplexer 200 is coupled to a sample and hold circuit 202. A select register 204 stores a value representing the particular input to the multiplexer that is to be passed to the multiplexer output at any one time. As is well known, the multiplexer 200 includes a select input that operates to select one input to the multiplexer for output by the multiplexer, as a function of a signal applied to the select input. It should be understood that the select line illustrated in FIG. 4 can actually comprise several lines, with various combinations of digital signals on the lines representing, at any given time, one of the different inputs to the multiplexer. In the present exemplary embodiment of the present invention, the select line comprises three digital lines in order to uniquely identify, at any one time, one input from among the six available inputs. Likewise, the select register 204 comprises a three bit digital register that is coupled to the three bit select line and stores a unique value corresponding to a selected one of the multiplexer inputs for output to the sample and hold circuit 202.

The sample and hold circuit 202 receives the signal from the selected input of the multiplexer 200. In this manner, at any one time, the output of any one of the six components of the PRML channel is made available for capture by the sample and hold circuit 202. The sample and hold circuit 202 also includes an amplifier to amplify the captured signal to a level suitable for transfer to the DSP. The DSCLK clock signal is coupled to the sample and hold circuit 202 so that the sample and hold circuit 202 can clock the signal capture in synchronization with the PRML channel. In addition, a HOLD line is coupled to the sample and hold circuit 202 to control the time at which sampling begins.

The HOLD line is coupled to a delay counter 206 that receives each of the DSCLK and SYNCD signals. The delay counter 206 is also coupled to a delay register 208 that stores a delay value. The delay counter 206 counts DSCLK clock cycles from the time that the SYNCD state indicates that signals represent data, until the number of clock cycles equals the value stored in the delay register. When the count equals the delay register value, a signal is asserted by the delay counter 206 on the HOLD line to cause the sample and hold circuit 202 to capture and hold a sample of the signal from the selected multiplexer input set in the select register 204.

Figure 5:
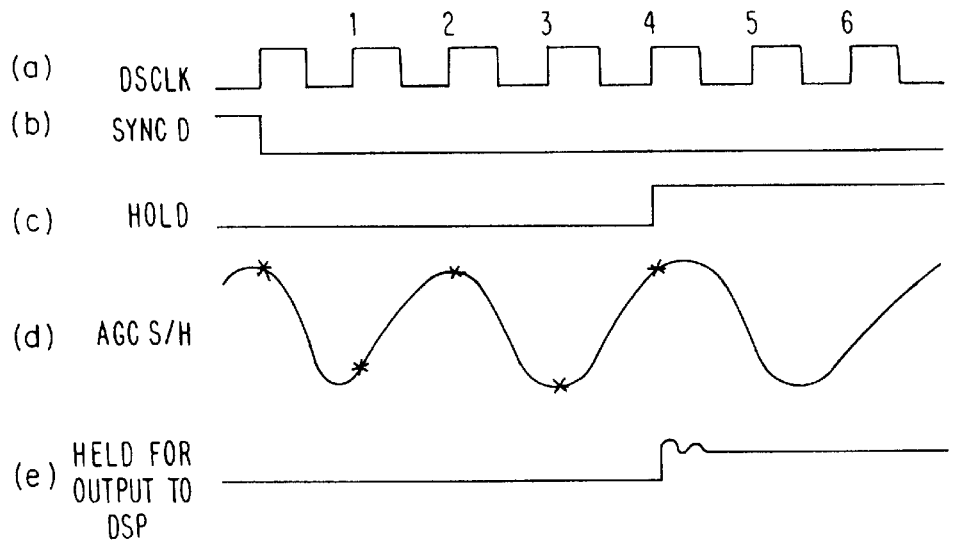
FIG. 5 is a timing diagram illustrating the timing controls for the register counter delay and multiplexer select blocks of FIG. 4 in relation to a representative signal to be captured by the DSP capture block of FIG. 3, and the output of the DSP capture block of FIG. 3.

FIG. 5 provides a timing diagram to illustrate the operation of the delay counter 206 and sample and hold circuit 202. In the example of FIG. 5, the selected multiplexer input is the output of the sample and hold circuit 70 that is operating to sample the output of the AGC 50 of the PRML channel (see FIG. 3). Each rising edge of the DSCLK corresponds to an appropriate time to sample the AGC sample output, after the SYNCD signal is set low. In FIG. 5, the rising edges of the DSCLK are numbered 1 through 6 as representative sample times available after the SYNCD signal is set low. The HOLD signal enables the sample and hold circuit 202 to sample the AGC sample output when it is set high.

As described above, the delay counter 206 sets the HOLD signal when the count value for the number of DSCLK cycles (after the SYNCD signal is set low) equals the delay value stored in the delay register 208. In the example of FIG. 5, the value stored in the delay register equals 4, and the delay counter 206 sets the HOLD signal high on the fourth rising edge of the DSCLK signal, after SYNCD goes low. At that time, a sample of the signal is captured and held by the sample and hold circuit 202, as shown in FIG. 5. The DSCLK clock cycle typically used in a PRML channel is faster than the clock cycle of the DSP. Accordingly, the sample and hold circuit 202 is operated to clock out each held sample to the DSP at the slower clock speed of the DSP.

As described above, a pseudo-random signal generation algorithm is used to generate test signals that are written on the storage disks 22a–d. A test signal can be written on each disk surface, as well as at certain preselected radial positions of each disk surface. For example, when zone bit recording is utilized in the drive, a test signal would be written within each zone of each disk surface. The disk drive is operated to read back each test signal and transmit the read back signals, one at a time through the PRML channel. The data capture circuit 68 can be operated in respect of each read back signal, and each component of the PRML channel for each read back signal, to acquire a full set of samples that can be used to fine tune the components of the PRML channel.

During a read back operation for a particular test signal, the storage disks 22a–d are continuously rotated and the test signal read back via the appropriate head 24a–h and transmitted to the PRML channel. A sample can be taken at each of a number of sample points of the read back signal, one per revolution of the disk, for each of the components of the PRML channel. The number of samples taken and position of sample points would be sufficient to provide signal information that can be used to reconstruct the signal waveform, according to known mathematical techniques.

To that end, the serial port circuit 210 available on the read/write control 36 is used by the DSP, via the SDEN, SCLK and SDATA lines, to address and write to each of the select register 204 and delay register 208. The DSP can select each component, one at a time, by writing a different value into the select register 204. While a particular component is selected, the DSP will change the delay value in the delay register 208 at each revolution of the disk, so that a different sample point is sampled during each revolution. If the delay register is an eight bit register, up to 256 different delay values can be stored, one per revolution, in the delay register 208.

As shown in the example of FIG. 5, an asterisk indicates each of four samples taken, one per revolution of the disk, at delay times corresponding to DSCLK cycles 1, 2, 3 and 4. The sampling can be continued, with an eight bit delay register 208, by changing the delay value in the delay register 208 at each revolution, for up to 256 revolutions of the disk to acquire up to 256 different sample points. The 256 sample points are received by the DSP from the sample and hold circuit 202, and stored in the RAM 43 for later use to reconstruct the entire waveform of the AGC sampled signal. The process can be repeated for each component of the PRML channel, by changing the value in the select register 204.

Thus, the present invention provides a straightforward mechanism to acquire and store signal information that can be used to test, diagnose and fine tune a read channel. The mechanism utilizes components already present on a disk drive, so that external devices are not required to fully test and fine tune a read channel circuit. Accordingly, the present invention increases the flexibility of a disk drive design by incorporating into the disk drive functionality that heretofore required additional, external test equipment.

What is claimed is:

1. For use in a storage device including a storage medium for storing data, an interactive element for reading information from and writing information on the storage medium and a processor for performing control functions in the storage device, a read channel, which comprises:

a set of electronic components for receiving and processing information read by the interactive element from the storage medium;

each component of the set of electronic components having an output and being coupled in a predetermined arrangement to other components of the set of electronic components to process the read information;

a data capture circuit including an input circuit and an output circuit;

the input circuit coupled to the output of each component of the set of electronic components;

the output circuit coupled to the input circuit to capture a signal from a preselected one of the outputs coupled to the input circuit, and being adaptable to transfer the captured signal to the processor.

2. The read channel of claim 1 wherein the input circuit comprises a multiplexer having a set of inputs, each input being coupled to the output of a respective one of the outputs of the set of electronic components, and an output coupled to the output circuit.

3. The read channel of claim 2 wherein the multiplexer includes a select input operable to transfer a selected one of the multiplexer inputs to the multiplexer output.

4. The read channel of claim 3 further comprising an addressable select register coupled to the select input and arranged to store a value to select one of the multiplexer inputs for transfer to the multiplexer output.

5. The read channel of claim 4 wherein the addressable select register is adoptable to be addressed and written by the processor.

6. The read channel of claim 1 wherein the output circuit comprises a sample and hold circuit to capture the signal by sampling and holding a preselected one of the outputs coupled to the input circuit.

7. The read channel of claim 6 wherein the sample and hold circuit is adaptable to transfer the held sample to the processor.

8. The read channel of claim 7 wherein the sample and hold circuit includes a hold input, and further comprising a delay counter coupled to the hold input to control the timing of sampling a preselected one of the outputs coupled to the input circuit via the hold input.

9. The read channel of claim 8 further comprising an addressable delay register coupled to the delay counter and arranged to store a value to control the operation of the delay counter.

10. The read channel of claim 9 wherein the addressable delay register is adoptable to be addressed and written by the processor.

11. The reach channel of claim 1 wherein the set of electronics components comprises a partial response maximum likelihood detection channel.

12. The read channel of claim 3 wherein the output circuit comprises a sample and hold circuit to capture the signal by sampling and holding the multiplexer output.

13. The read channel of claim 12 wherein the sample and hold circuit is adaptable to transfer the held sample to the processor.

14. The read channel of claim 13 wherein the sample and hold circuit includes a hold input, and further comprising a delay counter coupled to the hold input to control the timing of sampling a preselected one of the outputs coupled to the input circuit via the hold input.

15. The read channel of claim 14 further comprising an addressable delay register coupled to the delay counter and arranged to store a value to control the operation of the delay counter.

16. The read channel of claim 15 wherein the addressable delay register is adaptable to be addressed and written by the processor.

17. For use in a disk drive including a storage medium having data tracks for storing data, a spindle motor mounting the storage medium for rotation, an interactive element for reading information from and writing information on the data tracks of the storage medium and a processor for performing control functions in the disk drive, a read channel, which comprises:

a set of electronic components for receiving and processing information read by the interactive element from the data tracks;

each component of the set of electronic components having an output and being coupled in a predetermined arrangement to other components of the set of electronic components to process the read information;

a data capture circuit including an input multiplexer circuit and an output sample and hold circuit;

the input multiplexer circuit coupled to the output of each component of the set of electronic components;

the output sample and hold circuit coupled to the input multiplexer circuit to sample and hold a preselected one of the outputs coupled to the input multiplexer circuit and being adaptable to transfer a sample held in the output circuit to the processor.

18. The read channel of claim 17 wherein the input multiplexer circuit includes a select input operable to transfer a selected one of the outputs of the set of components to the output sample and hold circuit.

19. The read channel of claim 18 further comprising an addressable select register coupled to the select input and arranged to store a value to select one of the outputs of the set of components for transfer to the output sample and hold circuit.

20. The read channel of claim 19 wherein the addressable select register is adaptable to be addressed and written by the processor.

21. The read channel of claim 17 wherein the output sample and hold circuit includes a hold input, and further comprising a delay counter coupled to the hold input to control the timing of sampling a preselected one of the outputs coupled to the input multiplexer circuit via the hold input.

22. The read channel of claim 21 further comprising an addressable delay register coupled to the delay counter and arranged to store a value to control the operation of the delay counter.

23. The read channel of claim 22 wherein the addressable delay register is adaptable to be addressed and written by the processor.

24. The read channel of claim 17 wherein the set of electronic components comprises a partial response maximum likelihood detection channel.

25. A disk drive, which comprises:

a processor for controlling the disk drive;

a storage medium having data tracks for storing data;

a spindle motor mounting the storage medium for rotation;

an interactive element for reading information from and writing information on the data tracks of the storage medium;

a read channel for receiving and processing information read by the interactive element from the data tracks;

the read channel comprising a set of electronic components, each component of the set of electronic components having an output and being coupled in a predetermined arrangement to other components of the set of electronic components to process the read information; and a data capture circuit including an input multiplexer circuit and an output sample and hold circuit;

the input multiplexer circuit coupled to the output of each component of the set of electronic components;

the output sample and hold circuit coupled to the input multiplexer circuit to sample and hold a preselected one of the outputs coupled to the input multiplexer circuit and being adaptable to transfer a sample held in the output circuit to the processor.

26. The disk drive of claim 25 wherein the read channel comprises a partial response maximum likelihood detection channel.

27. The disk drive of claim 25 wherein the input multiplexer circuit includes a select input operable to transfer a selected one of the outputs of the set of components to the output sample and hold circuit.

28. The disk drive of claim 27 further comprising an addressable select register coupled to the select input and arranged to store a value to select one of the outputs of the set of components for transfer to the output sample and hold circuit.

29. The disk drive of claim 28 wherein the addressable select register is adaptable to be addressed and written by the processor.

30. The disk drive of claim 25 wherein the output sample and hold circuit includes a hold input, and further comprising a delay counter coupled to the hold input to control the timing of sampling a preselected one of the outputs coupled to the input multiplexer circuit via the hold input.

31. The disk drive of claim 30 further comprising an addressable delay register coupled to the delay counter and arranged to store a value to control the operation of the delay counter.

32. The disk drive of claim 31 wherein the addressable delay register is adoptable to be addressed and written by the processor.

* * * * *

UNITED STATES PATENT AND TRADEMARK OFFICE
CERTIFICATE OF CORRECTION

PATENT NO.    : 6,124,992
DATED         : September 26, 2000
INVENTOR(S)   : Bac V. Pham Page 1 of 1

It is certified that error appears in the above-identified patent and that said Letters Patent is hereby corrected as shown below:

Under [57] ABSTRACT:
Line 17, change "adoptable" to --adaptable--.

Column 13:
Line 29, change "adoptable" to --adaptable--.

Column 13:
Line 51, change "adoptable" to --adaptable--.

Column 13:
Line 53, change "reach" to --read--.

Column 13:
Line 54, change "electronics" to --electronic--.

Column 16:
Line 23, change "adoptable" to --adaptable--.

Signed and Sealed this

Twelfth Day of June, 2001

Attest:

NICHOLAS P. GODICI
*Attesting Officer*   *Acting Director of the United States Patent and Trademark Office*